United States Patent [19]

Unger et al.

[11] Patent Number: 5,721,910
[45] Date of Patent: Feb. 24, 1998

[54] RELATIONAL DATABASE SYSTEM CONTAINING A MULTIDIMENSIONAL HIERACHICAL MODEL OF INTERRELATED SUBJECT CATEGORIES WITH RECOGNITION CAPABILITIES

[75] Inventors: Sandra S. Unger, Convent Station; Sibylle Pagnucco, Somerville; Roger W. Cohen, Lambertville; Rocco A. Fiato, Basking Ridge, all of N.J.

[73] Assignee: Exxon Research and Engineering Company, Florham Park, N.J.

[21] Appl. No.: 655,262

[22] Filed: Jun. 4, 1996

[51] Int. Cl.⁶ .................................................. G06F 17/30
[52] U.S. Cl. .......................... 395/611; 395/614; 395/615
[58] Field of Search .................................. 395/611, 614, 395/615

[56] References Cited

U.S. PATENT DOCUMENTS

| | | |
|---|---|---|
| 5,142,674 | 8/1992 | Barker et al. ........................ 395/610 |
| 5,283,894 | 2/1994 | Deran ................................... 395/601 |
| 5,511,186 | 4/1996 | Carhart et al. ....................... 395/602 |
| 5,557,785 | 9/1996 | Lacquit et al. ....................... 395/615 |
| 5,594,837 | 1/1997 | Noyes .................................. 395/683 |
| 5,615,112 | 3/1997 | Liu Sheng et al. .................. 395/615 |
| 5,615,362 | 3/1997 | Jensen et al. ........................ 395/614 |
| 5,630,125 | 5/1997 | Zellweger ............................ 395/601 |
| 5,632,031 | 5/1997 | Velissaropoulos et al. ......... 395/611 |

*Primary Examiner*—Wayne Amsbury
*Attorney, Agent, or Firm*—Ronald D. Hantman

[57] ABSTRACT

The present invention is a database and a method of producing that database which can be used to determine the meaning of scientific or technical documents, such as patents and/or technical or scientific publications and/or abstracts of these patents or publications, and to assign the technical documents to one or more scientific or technical categories within a multidimensional hierarchical model which reflects the business, scientific or technical interests of a business, scientific or technical entity or specialty.

22 Claims, 4 Drawing Sheets

RELATIONAL DATABASE SYSTEM CONTAINING A MULTIDIMENSIONAL HIERACHICAL MODEL OF INTERRELATED SUBJECT CATEGORIES WITH RECOGNITION CAPABILITIES

BACKGROUND OF THE INVENTION

The present invention is a database. In particular, the present invention is multi-dimensional database that models a business or scientific or technical body of work. Relational databases are well known and have been used to manipulate discrete numerical values. There are many commercial databases available which permit the user to build relationships between tables and some of these databases allow large text fields to be stored and manipulated.

However, the prior art does not disclose a database system that can:

1) import and parse complex technical documents containing complex fields;
2) analyze the technical content of the documents in order to extract the meaning and assign these documents to one or more categories within a multidimensional hierarchy;
3) utilize mathematical formula to interrelate the different levels of the multidimensional hierarchy and derive higher (more abstract) meanings;
4) manipulate the parsed fields, the text fields and/or the categorizations to produce graphical and spreadsheet-like displays which allow the user to readily discern an overall pattern in the intensity of patent and/or research activity across a span of years;
5) manipulate the parsed fields, the text fields and/or the categorizations to produce graphical and spreadsheet-like displays which allow the user to readily identify trends and discontinuities in the overall pattern in the intensity of patent and/or research activity across a span of years;
6) allow the categorization to be easily verified by displaying the technical documents and/or abstracts of those documents and/or patent claims within one or more categories to which it was described in 2);
7) allow engineers or scientists to evaluate the technical details of individual patents and/or scientific or technical literature and to capture this evaluation into subject-specific tables which capture the essence of the document into sortable discrete fields;
8) link the relational database containing some or all of the above capabilities to an electronic source of the full text or abstracts of U.S. patents and/or foreign patents and/or foreign patent applications. The full text of these patents and/or applications may be stored in a database, on a CD-ROM, on a LAN, on a WAN or on the Internet.

Mathematical methods similar to weighted sum have been used against numerical measurements based on physical phenomena to measure contributions to gross mechanical properties. An example is a weight average of polymer concentrations of a particular molecular weight and their contributions to the overall gross physical properties of the polymer.

These methods have not been suggested as a means of capturing the technical content of complex documents such as patents or technical documents and calculating the contribution of each patent or technical document to an abstract scientific or business discipline by taking into account the weighting factors which represent the stored cumulative expertise of a team of experts in the scientific or business discipline. In particular, there has been no suggestion of using this method to identify patterns of research efforts as reflected in the patents or technical publications obtained by a scientific or business entity. More particularly, there has been no suggestion of using such methods to identify trends and discontinuities in the overall patterns of research efforts as reflected in the patents obtained by a scientific or business entity. These types of mathematical relationships are most easily determined by the use of electronic databases.

SUMMARY OF THE INVENTION

The present invention is a database system and a method of producing that database which can be used to assign scientific or technical documents, such as patents and/or technical or scientific publications and/or abstracts of these patents or publications, to one or more scientific or technical categories within a multidimensional hierarchical model which reflects the business, scientific or technical interests of a business, scientific or technical entity or specialty. Lower level categories which reflect scientific concepts and technology may be recognized and assigned by use of a set of expert technical searches (ETS). Higher level, more abstract, concepts may be recognized and assigned by mathematically manipulating the matrix of lower level scientific and technology concepts, in combination with a matrix of contributions to higher level concepts, which reflects the stored cumulative expertise of a team of technical or scientific experts. The population of each category, within the multidimensional hierarchy may be used to prepare graphical and/or tabular overviews which reflect the research activity within a business or technical entity or specialty over a span of years and across an unlimited number of dimensions. The graphical and/or tabular overviews allow trends and discontinuities to be readily identified. The apparent trends and discontinuities may be verified by examining the individual documents and/or abstracts and/or patent claims, and/or all associated fields which contribute to both the overall trends and any specific trends within a business entity or technical specialty. Specific detail on individual documents and/or abstracts and/or claims may also be captured in discrete fields and linked to the categories within the hierarchical model and the technical documents and/or abstracts and/or claims. All of the above data may also be linked to full-text sources of the documents.

DESCRIPTION OF THE PREFERRED EMBODIMENT

The present invention is a database system which contains a hierarchical model of a complex business, scientific or technical entity or specialty and the associated technical documents, such as patents or scientific or technical publications, or abstracts of those patents or publications, which reflect each aspect of that model. Each technical document may be assigned to one or more categories within the hierarchical model. The model and associated technical documents and/or abstracts and/or technical indexing may be used to determine trends and discontinuities within the bounds of the model and may also be used to project unanticipated trends and discontinuities beyond the bounds of the model. The individual documents and/or abstracts within one or more categories or subsets of categories, may be displayed along with the corresponding U.S. claims and/or European granted or application claims by use of a relational database which is viewed through a computerized graphical interface.

This database disaggregates a set of patents and/or technical documents into discrete technical categories by use of a set of pre-defined search protocols which match the scientific or technical concepts within the model. The pre-defined search strategies automatically categorize the set of technical documents to fit the multidimensional hierarchical model of a scientific or business discipline. The pre-defined search strategies may be conducted on a commercial database system and the results of these searches stored in a local electronic database. Alternatively, the pre-defined search strategies may be conducted in a local electronic database containing records captured from a commercial database system or by a combination of these two methods. The categorization may then be used by the relational database to identify trends and discontinuities in the research efforts represented by the technology in the underlying technical documents and/or patents. The categorization may also be used to allow the technical experts to chill-down and examine the underlying documents and/or abstracts and/or claims which contribute to these trends and discontinuities.

The overall goal of this method is to use this model to identify unanticipated trends and discontinuities in the pattern of research effort in a technical, scientific or business entity or discipline as reflected by the technical documents and/or patents obtained by that scientific or business entity or discipline, where the overall pattern itself has been previously hidden due to both the complexity of the individual documents and the large number of documents being considered. In addition, this method of analysis may be used to confirm anticipated trends and discontinuities in the pattern of research effort in a technical, scientific or business entity or discipline as reflected by the technical documents and/or patents obtained by that scientific or business entity or discipline, where the overall pattern itself has been previously hidden due to both the complexity of the individual documents and the large number of documents being considered.

The documents and/or abstracts and/or claims and/or technical indexing may be electronically stored in a relational database and linked to the categorization which reflects the overall hierarchical model. The documents and/or abstracts and/or claims and/or technical indexing may be displayed on a computerized graphical interface. All of the documents may be displayed or only those documents within one or more categories may be displayed or only those documents within a subset of one or more categories may be displayed. Subsets of all of the documents and/or subsets of one or more of the categories may be selected by further searching of any of the stored data. These subsets of documents and/or abstracts and/or claims may be displayed on a computerized graphical interface.

The relational database can also contain subject-specific tables of technical details such as catalyst precursors, cocatalysts, reaction conditions, reactor types, or product characteristics, which are captured in a discrete form by scientists evaluating the underlying patents or technical documents.

The relational database can also contain links to full-text sources of patents or technical documents either in a database, on a CD-ROM, a local LAN, a Wide-Area-LAN or on the Internet. The retrieved full-text patents may include the full text of U.S. and/or foreign patents or published patent applications and may also include images of the full patents or a combination of text and images. The retrieved full text technical documents may also include the full text and or images of scientific or technical publications.

The present database can be used to answer a number of questions. The database can be used to identify the overall pattern of research activity, as reflected in the number of patents or technical documents. The database can also be used to identify trends and discontinuities across the multidimensional hierarchy which is needed to model complex scientific, technical and business disciplines. Specifically this database can pose questions such as:

"What are the interesting areas within the boundaries of this model?"

"What change has occurred in the area of catalytic cracking?"

"Where have competitor companies concentrated their research efforts as reflected in the number of patent applications or technical publications over the past 10 years?"

"To what areas have competitor companies moved their top researchers?"

"Which patents have used a particular catalyst in combination with a particular cocatalyst with a particular solvent for a polymerization of a particular monomer?"

"Which companies are the top 15 most active in the area of biopolymers and what sub-specialties have they processed over the last 10 years?"

In order to create a computer system which can answer higher level questions such as these, the computer system must have a pre-defined model of the overall scientific or business discipline and the computer system must have already analyzed the technical content of each patent or technical document with respect to that model. The system of sophisticated technical searches and the method of applying those searches to a set of technical documents, such as patents, to categorize those documents to match a multidimensional hierarchy which models a scientific or business entity or discipline is the subject of this patent memo.

The relational database can also contain subject-specific tables of technical details such as catalyst precursors, cocatalysts, reaction conditions, reactor types, product characteristics, which are captured in a discrete form by scientists evaluating the underlying patents. The original classification serves to group similar patents together. An individual scientist or engineer may then evaluate each patent in a particular group and capture the essential details of each invention into a subject-specific table which can be linked back to the original documents and/or abstracts and to the original categorization. The expert analysis can also feed back into the categorization of the patents to enhance the categorization achievable by sophisticated technical searches.

Figure 1:
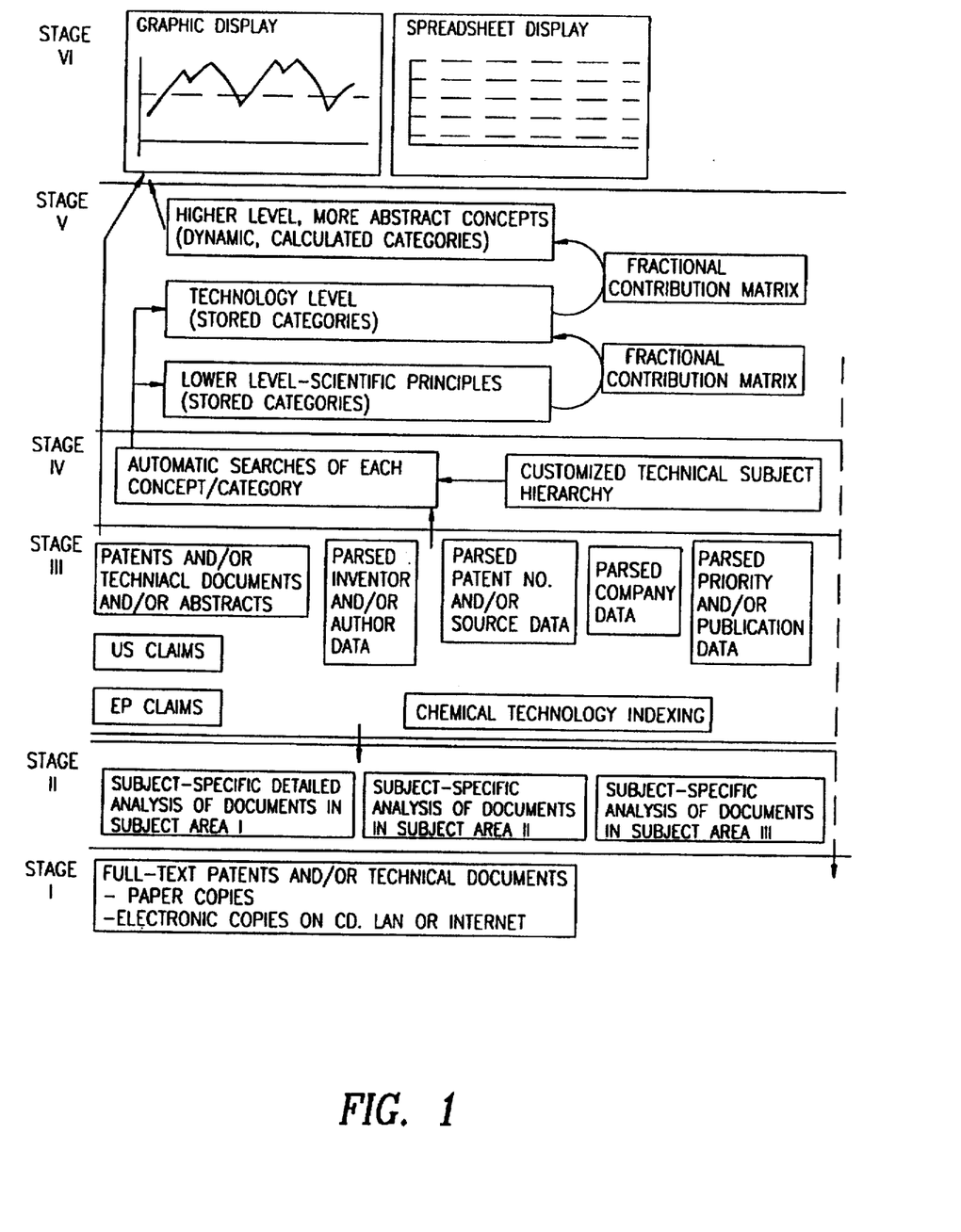
FIG. 1 shows a schematic diagram of the database.

FIG. 1 shows a high-level overview of the database design covered by this invention, with increasing levels of abstraction. Stage I is the least abstract and Stage VI is the most abstract.

Stages I and II represent well known methods of dealing with collections of full-text patents and semi-organized analyses of those collections of patents in the form of spreadsheets or small databases. Stage III through VI represent the subject of this invention whereby increasingly abstract concepts and overviews can be derived from a collection of electronically available patent abstracts, and/or technical documents, technical indexing, and patent claims.

Stage I represents the actual patents or technical documents, whether in a stack of paper copies or in an electronic collection on a CD-ROM, in a database, on a LAN or on the Internet.

Stage II represents commonly used methods of analyzing full-text patents and/or technical documents and storing that patent-by-patent analysis in the form of subject-specific spreadsheets, and small databases. An enhancement represented by the current invention is that these detailed analyses can then be electronically linked to a given patent and/or patent family and electronically displayed along with the Patent Abstracts and/or Patent Claims and/or technical documents.

Stages III through VI represent the database design of this invention. Stage III represents the electronic capture of Patent Abstracts, and/or technical documents and the parsing of the complex, multi-entity data fields which usually accompany these Patent Abstracts, such as the Patent Inventors, Patent Numbers, Patent Companies (Assignees), Patent Legal Status and Patent Priority data. For example, the Parsed Patent Number Record would capture a separate record for each patent equivalent including the patent number, publication date and patent status. Similar levels of detail are captured for each parsed field. Also represented at this level is the electronic capture of the U.S. Claims and the European Claims (granted patent and published applications) and associated information such as inventor and assignee. All of these fields are electronically linked and may be electronically displayed as a set of information pertinent to one particular patent and/or patent family on a computerized graphical interface. Technical Documents may be similarly captured and the associated complex fields parsed to yield normalized data.

Stage IV represents the design of a Customized Technical Subject Hierarchy which models the specific interests of a business entity or technical or scientific specialty and the many facets of that entity or specialty. The hierarchical model consists of two or more levels, each level consisting of sets of categories which define the concepts being modeled. For example, this method models business, scientific, or technical entities and/or specialties at two levels in the same sense as a Genus-Species relationship. The higher level terms would correspond to a broader, more abstract genus and the lower level categories would correspond to a more specific set of sub-categories corresponding to the species. A multiplicity of levels can be employed to capture complex topics which require more than two levels of abstraction.

This Technical Subject Hierarchy is used to create a set of sophisticated expert technical searches (ETS), using the best chemical and technical indexing available along with the text of the patent abstracts and/or the patent claims and/or the technical document. An expert search is created to identify patents or technical documents that are pertinent to each individual category within the Customized Technical Subject Hierarchy and the results of these searches are electronically stored in tables represented by Stage V. The stored results are electronically linked to the corresponding patent and/or patent family. Stage IV Automatically feeds into Stage V.

The set of expert searches represented by Stage IV can be automatically executed against a new set of patents and/or technical documents. This new set of patents and/or technical documents may represent either recently published patents or technical documents and/or recently identified patents or technical documents and/or older collections of patents or technical documents which are now being captured with the methods of this invention.

Stage V represents the stored assignment of each patent to one or more oft he categories in the Customized Technical Subject Hierarchy of Stage IV. By this approach, each category is populated with records that match the search criteria. The automatic execution of expert technical searches analyze the indexing, abstract, text and/or claims for each patent and assign each patent and/or technical document to one or more categories in the Customized Technical Subject Hierarchy of Stage IV. Additionally, Stage V includes one or more Fractional Contribution Matrices which may be used to derive more abstract concepts from the existing categorization. The Fractional Contribution Matrices are created by collecting the combined expertise of acknowledged experts in a technical or scientific field and representing this expertise in a stored matrix. This Fractional Contribution Matrix represents the cumulative expertise of a set of technical experts as to how much a lower level scientific or technology category will contribute to a higher-level, more abstract concept.

The database system allows patents and/or technical documents to be electronically captured and analyzed at a convenient time. This set of analyzed patents and/or technical documents may then be used to identify trends and discontinuities in the overall pattern of research efforts represented by the set of patents or technical documents. These trends and discontinuities may be identified any time following the analysis of the set of patents and/or technical documents. The stored analysis may be used minutes, days, months or years later.

Stage V and the Parsed data from Stage III feed into Stage VI. Stage VI represents a high-level overview of a business, scientific or technical entity or specialty and provides a method for grasping the pattern of research effort represented by a collection of patents or technical documents. These patterns are obscure at Levels I and II, and can only be clearly observed after pursuing the methods of this invention to achieve the higher level abstraction represented by Stages III through VI.

The dashed line from Stage V to Stage I represents the fact that the data stored in the database, and all associated analyses of Stages II although VI, may be used to identify patents and/or technical documents of particular interest for a particular application. The patent numbers for this set of patents may then be used as unique identifiers to electronically link to full text sources of patents and display the full text and associated graphic images of the set of patents. The electronic full text sources of these patents may be on a CD-ROM, in a database, a LAN or on the Internet. Unique Identifiers may similarly be used to link to sources of full-text technical or scientific documents. I. Reducing Unstructured Text to Fit a Multidimensional Database The unstructured text in technical documents is reduced to fit a multidimensional hierarchy which models a complex system of scientific or business information, such as that represented by the body of patents pertinent to a particular scientific or business discipline. This method utilizes sophisticated expert technical searches (ETS) to automatically categorize technical documents, such as patents or scientific publications. This method disaggregates a set of patents or technical documents into discrete technical categories by use of a set of pre-defined search protocols to assign each document to one or more categories. A complex set of technical and/or scientific search strategies may be produced to identify and automatically categorize documents to fit a pre-defined matrix of technical categories. The matrix of technical categories models a scientific, engineering or business area and may consist of hundreds of categories on one or more levels of abstraction.

Each category has a unique set of characteristic terms associated with it. For each category a predefined set of search parameters would be created comprised of technical search terms such as U.S. Patent Classification International Patent Classification Technical Indexing Terms Chemical Structures Chemical Formulas Registry Numbers Chemical Codes Polymer Codes Database-Specific Codes and Descriptors Title Text Abstract Text Full Text of original documents and/or patents The expert technical and/or scientific searches (ETS) use all the expertise of a skilled technical searcher and capture that expertise in a set of pre-defined search strategies. These pre-defined search strategies may be run against one or more sets of technical documents, such as patents assigned to a particular business or scientific entity or in a particular technical specialty. The pre-defined search strategies automatically categorize the set of technical documents to fit the multidimensional hierarchical model of a scientific or business discipline. The pre-defined search strategies may be conducted on a commercial database system and the results stored in a local electronic database or the pre-defined search strategies may be stored and executed in a local electronic database containing records captured from a commercial database system. The categorization may then be used to identify trends and discontinuities in the research efforts represented by the technology in the underlying technical documents and/or patents. Furthermore, mathematical relationships may be applied against the matrix of technical categories to extract hidden details and patterns and to generate additional levels of abstraction.

Example 1 shows the logic for automatically assigning patents to a pre-defined subject-specific-hierarchy, using a series of expert technical searches (ETS). Similar methods could also be used to automatically categorize scientific and/or technical publications.

EXAMPLE 1

Automatically Assigning Patents to Categories Within a Hierarchical Model of a Business or Technical Specialty Create a Subject Hierarchy which models a complex business or technical entity For each Subject in the Hierarchy Create an expert technical search (ETS)

Apply the expert technical search against a set of patent data

For each patent which matches the expert technical search (ETS) criteria create a record in a table indicating the subject and the patent's unique identifier Example 2 shows a portion of a Subject Hierarchy which could be used to model a business or technical entity. For each category within the Subject Hierarchy, in Example 2, an expert technical search (ETS) would be created which would use all the expertise of a skilled information specialist to capture patents or technical documents that fit that subject category. Note that the hierarchy in Example 2 makes no attempt to categorize all Biopolymers, but rather only categorizes those Biopolymers of interest to a particular business or technical specialty.

EXAMPLE 2

A Partial Hierarchy representing the Interests of a Particular Business or Technical Specialty

| | |
|---|---|
| 1000 | Biopolymers |
| 1010 | Phosphorus-Modified Biopolymers |
| 1020 | Polyester-type Biopolymers |
| 1030 | Biopolymers as Metal Supports |

Example 3 shows two sample expert technical searches (ETS) which could be created to identify those patents or technical documents which should be assigned to subjects within the Partial Subject Hierarchy of Example 2. Example 3 shows the expert technical searches needed to identify patents which should be assigned to category 1010 (Phosphorus-Modified Biopolymers) and to category 1020 (Polyester-type Biopolymers) within the Subject Hierarchy of Example 2.

EXAMPLE 3

Expert Technical Searches Created to Achieve Optimum Recall and Specificity within the Limits of the Available Indexing System(s) 1010 Phosphorus-Modified Biopolymers

| 1010 Phosphorus-Modified Biopolymers |
|---|
| 1: P0599/PI (S) M2460/PI |
| 2: (2001/KS > 0201/KS) and (C08L-001:/IC or C08L-003:/IC or C08L-005:/IC or 1985/KS) |
| 3: (BIOPOLYMER/LT or CELLULOSE/LT or CELLULOSIC RESIN/LT or NATURAL RESIN/LT or POLYSACCHARIDE/LT or HYDROXYETHYL CELLULOSE/LT or HYDROXYPROPYL CELLULOSE/LT) LINK (PHOSPHORUS ORGANIC/LT or PHOSPHORUS CONTAINING ACID/LT) |
| 1 or 2 or 3 |

| 1020 Polyester-type Biopolymers |
|---|
| 1: /LT biopolymer/p.polyester/p |
| 2: (1291/KS or C08G-063/06/IC or polyester/p/LT) and (*biosynethesis/it or C12P-007/42/IC or C12P-007/62/IC) |
| 1 or 2 |

The expert subject searches in Example 3 would be further modified and customized to fit the particular needs of a specific hierarchical model. For example, the overall database might be focused on oil well drilling additives or it might be focused on cosmetic formulations. The searches would be further refined to selectively retrieve one set of patents or technical documents for a database focused on fluid loss control additives, for use in oil well drilling fluid additives, and to selectively retrieve a different set of patents or technical documents for a database focused on cosmetic formulations.

II. Multidimensional Tabular and Graphical Display of Data

Figure 2:
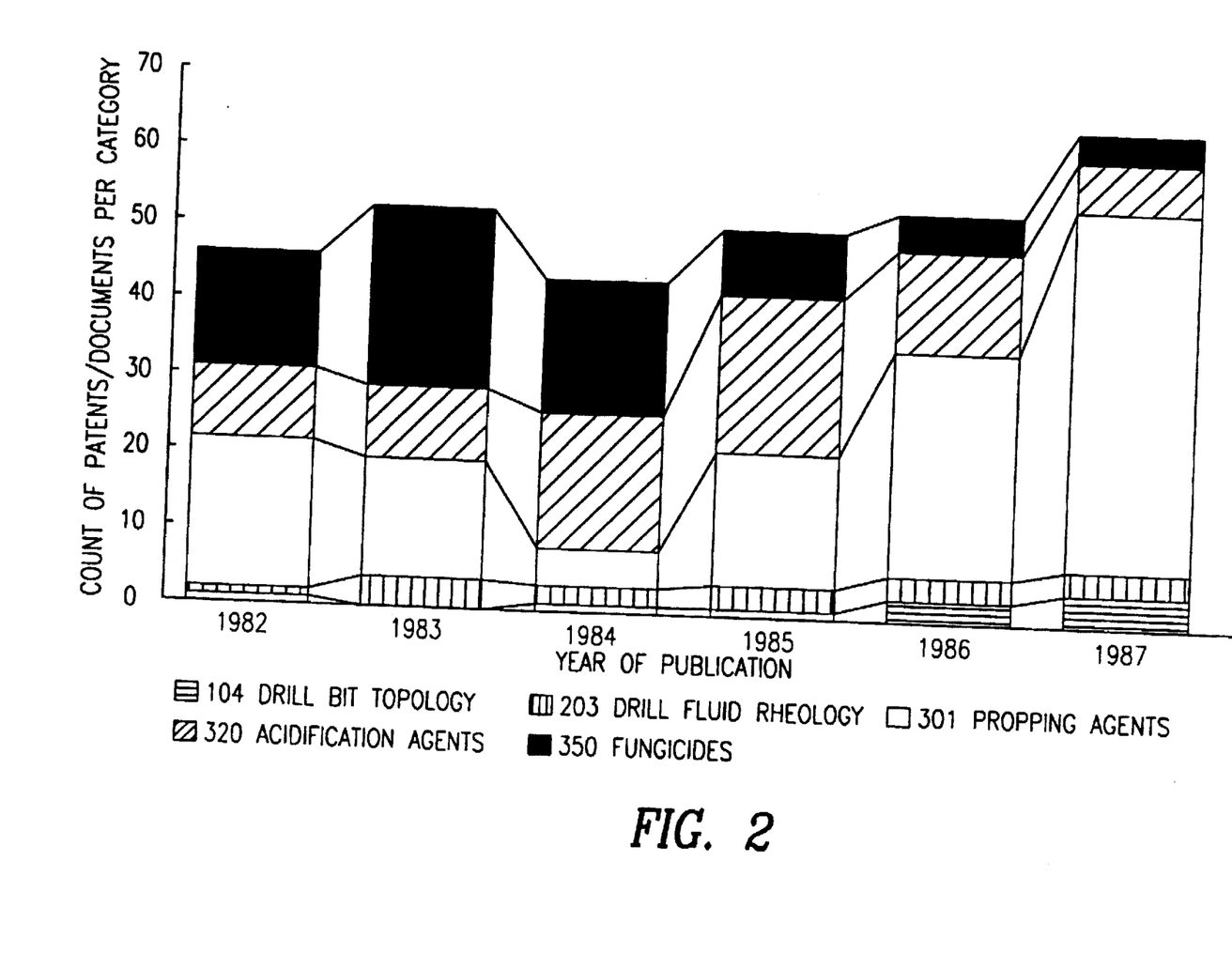
FIG. 2 shows one type of graphical display using the database of the present invention.

In the preceding steps, each patent has been automatically assigned to one or more categories within the Subject-Specific-Hierarchy and linked to the parent patent record in the relational database. Also in preceding steps, the complex, multi-entity data fields have been parsed to multi-field tables and linked to the parent patent or technical document record in the relational database. Table 3 and FIG. 2 show two of the simplest displays possible using these Subject-Categories.

Table 2 shows a portion of the table which stores the assigned Subject-Categories. These are the same Subject-Category), assignments that are created by using stored expert technical searches (ETS) to assign individual patents or technical documents to the categories within a Subject-Specific-Hierarchy. These stored category assignments may be used to create a tabular display of the subject-assignments over a span of years as shown in Table 3. These categories may also be used to create a graphical display of the subject-assignments over a span of years, as shown in FIG. 2.

TABLE 2

| Category | Year | Unique ID |
|---|---|---|
| 104 Drill Bit Topology | 1982 | 12345678 |
| 104 Drill Bit Topology | 1984 | 23456789 |
| 104 Drill Bit Topology | 1985 | 34567890 |
| 104 Drill Bit Topology | 1986 | 45678901 |
| 104 Drill Bit Topology | 1986 | 56789012 |
| 104 Drill Bit Topology | 1986 | 67890123 |
| 104 Drill Bit Topology | 1987 | 78901234 |
| 104 Drill Bit Topology | 1987 | 89012345 |
| 104 Drill Bit Topology | 1987 | 90123456 |
| 104 Drill Bit Topology | 1987 | 99123456 |
| 203 Drill Fluid Rheology | 1982 | 12345678 |
| 203 Drill Fluid Rheology | 1983 | 78123456 |
| 203 Drill Fluid Rheology | 1983 | 67123456 |
| 203 Drill Fluid Rheology | 1983 | 56123434 |
| 203 Drill Fluid Rheology | 1983 | 45123345 |
| 203 Drill Fluid Rheology | 1984 | 23456789 |
| 203 Drill Fluid Rheology | 1984 | 23123435 |

TABLE 3

Counts of Patents per Category per Year

| Category | 1982 | 1983 | 1984 | 1985 | 1986 | 1987 |
|---|---|---|---|---|---|---|
| 104 Drill Bit Topology | 1 |  | 1 | 1 | 3 | 4 |
| 203 Drill Fluid Rheology | 1 | 4 | 2 | 3 | 3 | 3 |
| 301 Propping Agents | 19 | 15 | 4 | 18 | 31 | 51 |
| 320 Acidification Agents | 10 | 10 | 17 | 20 | 14 | 7 |
| 350 Fungicides | 15 | 23 | 19 | 11 | 6 | 3 |

There is no limit to the number of dimensions which can be displayed in this fashion. More complex tabular displays and graphical displays may be created by linking the category populations (i.e. the count of patents assigned to each category) to the multi-entity data fields (e.g. patent number, patent status, patent publication date, company data, inventor data) and creating multidimensional tabular and graphical displays. Example 3 shows the logic of creating a display by company, of the top 15 inventors, by inventor (one inventor per page), by subject-category (one subject-Category per line), per year (one count of patents per column) with totals accumulating the total number of patents filed by a particular inventor in a particular company across a span of years.

EXAMPLE 3

For each Company
  For a selected set of Subject-Categories
    For a selected range of years
      Identify the 15 Inventors with the highest number of patents
      For the Inventor with the highest number of patents
        Produce a tabular display by Subject Category by Year
        Produce a graphical display by Subject Category by Year
      For the Inventor with the next highest number of patents
        Produce a tabular display by Subject Category by Year
        Produce a graphical display by Subject Category by Year
      For the Inventor with the next highest number of patents
        Produce a tabular display by Subject Category by Year
        Produce a graphical display by Subject Category by Year
      etc.

Figure 3:
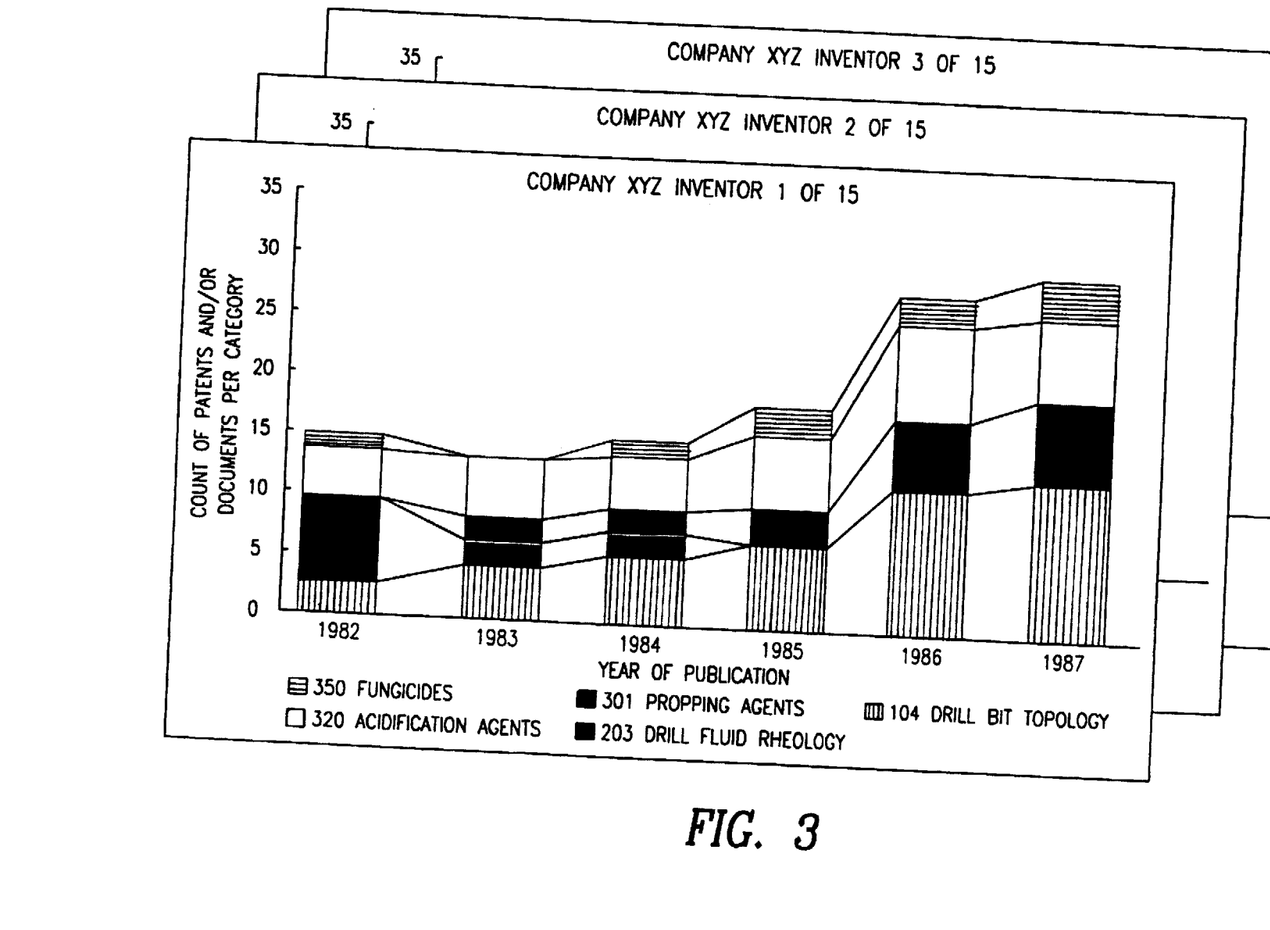
FIG. 3 shows the graphical display for Example 3.

The inventors may be sorted by the total number of patents filed within a selected set of subject-categories, within a selected range of years, within a particular company and displayed in a series of tabular and graphical displays. As shown in FIG. 3, the first page would display a tabular or graphical overview of the number of patents filed by the most active inventor, in each category, within company XYZ, over a span of years. The next page would display a tabular or graphical overview of the number of patents filed by the next most active inventor, in each category, within company XYZ, over a span of years and so on for the top 15 inventors. A display of this type could be used to identify trends and discontinuities in the research activity of the most prolific inventors within a company. Similar methods could be used to display the activities of authors of technical and/or scientific documents.

III. Multidimensional Hierarchy of Interrelated Subject Categories

This invention further includes the method of deriving more abstract concepts from the set of stored category), assignments, by applying mathematical methods to extract these more abstract concepts. These more abstract concepts can not be readily identified by the application of expert technical searches alone. However, a method of quantifying the research effort expended in the areas defined by each of these more abstract concepts is of great value. These more abstract concepts can be identified by the use of both the matrix of technical and/or scientific concepts, identified by the application of expert technical searches, and a matrix of stored expert opinion. The matrix of stored expert opinion represents the cumulative opinion of a group of expert technical staff and/or scientists, on the fractional contribution of each technical and/or scientific concept to each of the higher-level, more abstract concepts.

The present database includes a multidimensional hierarchy of subject categories wherein the different levels of the hierarchy are interrelated by a mathematical formula. The mathematical formula which interrelates the different levels takes the form of a sum of an aggregate count of unique items in a category multiplied by weighting factors for each category in the next higher (more abstract) level. Each higher (more abstract) level of the hierarchy is therefore a weighted sum of contributions from each category in the previous level. The aggregate count of unique items is arrived by modeling a scientific or business discipline based on the technical content of patents and/or technical documents in that scientific or business discipline. The weighting factors are derived by the cumulative knowledge of experts in that scientific or business discipline to reflect the impact of each technical category on the next the higher level of the hierarchy.

$$f(x1) = \text{sum}((\text{attribute-1} * \text{weighting-factor-1}) + (\text{attribute-2} * \text{weighting-factor-1}) + \ldots )$$

$f(x2)=\text{sum}((\text{attribute-1*weighting-factor-2})+(\text{attribute-2*weighting-factor-2})+\ldots)$ $f(x3)=\text{sum}((\text{attribute-1*weighting-factor-3})+(\text{attribute-2*weighting-factor-3})+\ldots)$ In particular, these weighted averages may also be calculated across a span of years to reflect a multidimensional representation of research efforts across a span of technologies and across a span of years.

The Higher Level Subject Categories may be derived by matrix manipulation of two matrices, one representing the known subject category assignments in a hierarchical model of a business or technical specialty, and the other matrix, representing the cumulative knowledge of technical experts in a given business or technical entity or specialty. Table 4 shows a two dimensional matrix which represents the number of patents assigned to selected subject categories across a selected span of years. Table 4 may represent the patents filed by an entire company, or the patents filed in a particular business enterprise, or the patents filed by a particular inventor within a particular company or business enterprise, as examples.

TABLE 4

Counts of Patents per Category per Year

| Category | 1982 | 1983 | 1984 | 1985 | 1986 | 1987 |
|---|---|---|---|---|---|---|
| 104 Drill Bit Topology | 1 | 0 | 1 | 1 | 3 | 4 |
| 203 Drill Fluid Rheology | 1 | 4 | 2 | 3 | 3 | 3 |
| 301 Propping Agents | 19 | 15 | 4 | 18 | 31 | 51 |
| 320 Acidification Agents | 10 | 10 | 17 | 20 | 14 | 7 |
| 350 Fungicides | 15 | 23 | 19 | 11 | 6 | 3 |

Table 5 represents the cumulative knowledge of a group of technical experts in a given business or technical entity. For example, Table 5 may represent the collective opinion of a group of technical experts on the contribution of a patent in Drill Bit Topology to a series of higher level concepts. For example the cumulative knowledge may say that a single patent in Drill Bit Topology would contribute 0.22 patent-units toward a theoretical patent in Drill Bit Deposition, 0.24 patent-units toward a theoretical patent in Drill Bit Corrosion, and 0.27 patent-units toward a theoretical patent in Formation Penetration.

TABLE 5

Fractional Contribution Matrix of Each Category to a Higher-Level Concept

| Category | A Drill Bit Deposition | Drill Bit Corrosion | Formation Penetration | Formation Stability | Environ. Impact of Fluid | Environ. Impact of Trailings |
|---|---|---|---|---|---|---|
| 104 Drill Bit Topology | 0.22 | 0.24 | 0.27 | 0.11 | 0.07 | 0.09 |
| 203 Drill Fluid Rheology | 0.33 | 0.12 | 0.19 | 0.02 | 0.23 | 0.11 |
| 301 Propping Agents | 0.09 | 0.07 | 0.22 | 0.5 | 0.05 | 0.07 |
| 320 Acidification Agents | 0.12 | 0.33 | 0.19 | 0.06 | 0.22 | 0.08 |
| 350 Fungicides | 0.05 | 0.04 | 0.21 | 0.06 | 0.32 | 0.32 |

Table 6 represents the summation of the matrix multiplication of these two matrices leading to the estimate of the number of theoretical patents in these higher level subjects. For example, the number of theoretical patents in Drill Bit Deposition would be derived by multiplying column A, which represents the cumulative opinion of a group of technical experts (Table 5), by the number of patents in each category for each year (Table 4) and summing the contribution of each category to the theoretical number of patents in Drill Bit Deposition. Table 6 displays the derived count of patents in each of these higher-level, more abstract concepts, across a span of years.

TABLE 6

Theoretical Count of Patents in a Higher-Level Concept

| Category | 1982 | 1983 | 1984 | 1985 | 1986 | 1987 |
|---|---|---|---|---|---|---|
| Drill Bit Deposition | 4.21 | 5.02 | 4.23 | 5.78 | 6.42 | 7.45 |
| Drill Bit Corrosion | 5.59 | 5.75 | 7.13 | 8.9 | 8.11 | 7.32 |
| Formation Penetration | 9.69 | 10.79 | 8.75 | 10.91 | 12.12 | 14.83 |
| Formation Stability | 11.13 | 9.56 | 4.31 | 11.03 | 17.09 | 26.6 |
| Environ. Impact of Fluid | 8.25 | 11.23 | 10.55 | 9.58 | 7.45 | 6.02 |
| Environ. Impact of Trailings | 7.13 | 9.65 | 8.03 | 6.8 | 5.81 | 5.78 |

Table 7 represents the calculation of the theoretical number of patents in Drill Bit Deposition which would be represented by a set of patents. For each subject category from Table 4, the number of patents would be multiplied by the fractional contribution of that subject category, from Table 5, Drill Bit Deposition in year 1982. The theoretical number of patents contributed by each category would be summed to arrive at a theoretical number of patents in Drill Bit Deposition in 1982.

TABLE 7

Sample Calculation of Drill Bit Deposition Patents in 1982

| Category | 1982 | Fractional Contribution | Theoretical Number of Patents |
|---|---|---|---|
| 104 Drill Bit Topology | 1 | 0.22 | 0.22 |
| 203 Drill Fluid Rheology | 1 | 0.33 | 0.33 |
| 301 Propping Agents | 19 | 0.09 | 1.71 |
| 320 Acidification Agents | 10 | 0.12 | 1.2 |
| 350 Fungicides | 15 | 0.05 | 0.75 |
| | | | 4.21 |

Figure 4:
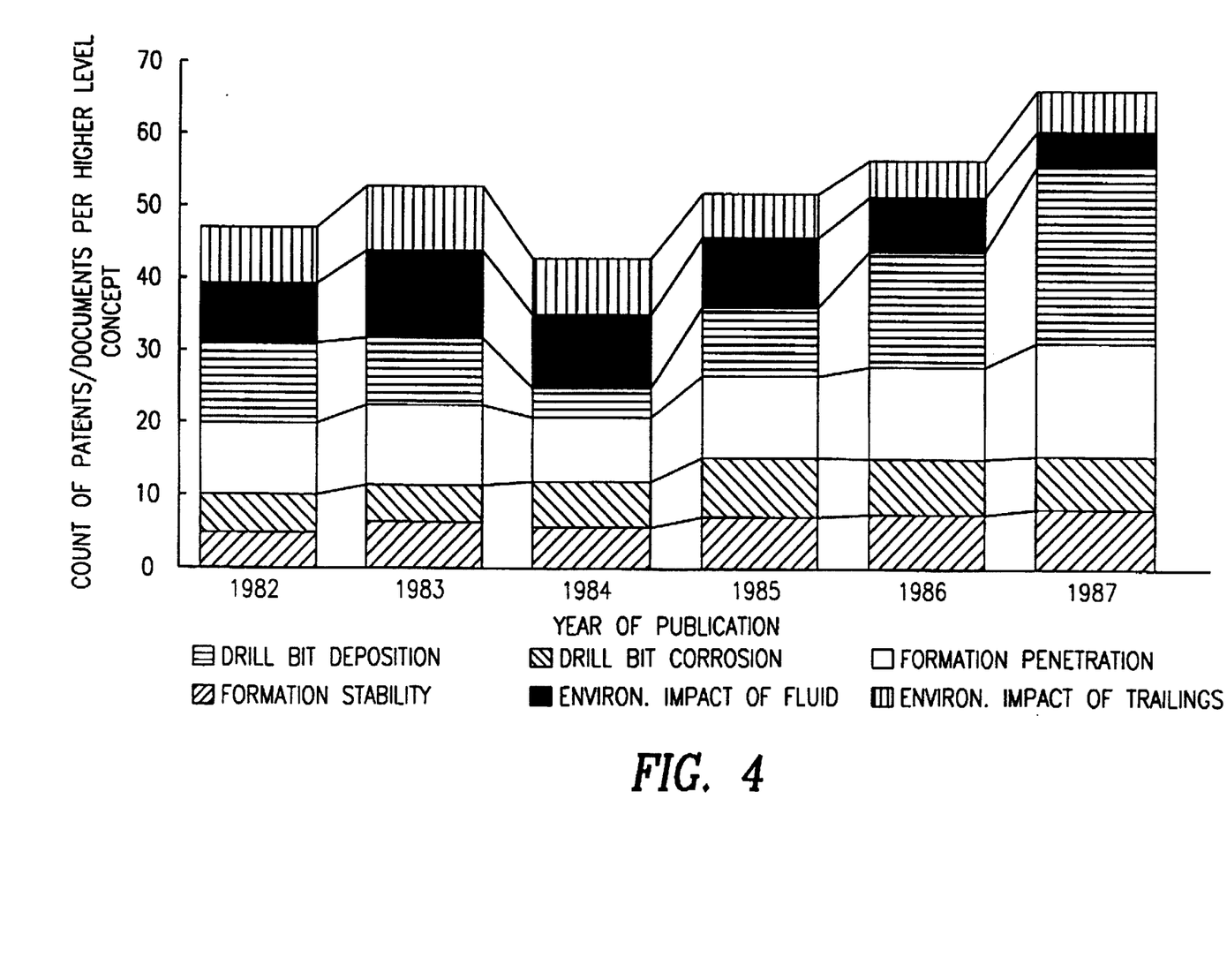
FIG. 4 shows the graphical display of Table 6.

FIG. 4 displays the data from Table 6 in a graphical display which allows the trends and discontinuities in the research patterns, represented by the count of theoretical patents, in the higher-level, more abstract subjects in Table 6, to be observed. These trends and discontinuities were previously hidden due to both the complexity and length of each patent and/or technical document in the set of documents under review, and also due to the complexity of the higher level concepts themselves. These higher level concepts can not be searched by use of an expert technical search (ETS) but rather must be derived from lower level concepts which can be searched using an expert technical search (ETS), using the methods of this invention.

What is claimed is:

1. A computer readable medium comprising a database system, including stored data of scientific or technical documents, such as patents, technical or scientific publications, abstracts of these patents or publications, and associated bibliographic and technical classification data, or combinations thereof such that said scientific and technical documents are assigned to one or more scientific or technical categories (category assignments) within a multidimensional hierarchical model of a business, scientific or technical entity or specialty, and said category assignments are stored in a relational database wherein said category assignments are used to identify one or more patterns, trends and/or discontinuities based on a population analysis of the categories.

2. The database system of claim 1 where the stored data and category assignments can be displayed on a computerized graphical device in the form of multidimensional tabular or graphical displays which permit the observation of trends and discontinuities within the business, scientific or technical entity or specialty being modeled.

3. The database of claim 1 wherein said stored data includes patent abstracts, patent identifiers, technical index tenths, patent classifications, patent claims, graphic images, chemical structures, and all or portions of the text of the patent or published patent application.

4. The database of claim 1 wherein said stored data includes the technical abstracts, document identifiers, technical index terms, graphic images, chemical structures, and all or portions of the text of the scientific or technical publication.

5. The database of claim 1 wherein said stored data includes a fractional contribution matrix which stores the cumulative opinion of a team of technical or scientific experts on the fractional contribution of each category to a set of higher-level (more abstract) concepts within the hierarchical model.

6. The database of claim 5 wherein a set of higher-level (more abstract) concepts are related to each stored category by a mathematical relationship.

7. The database system of claim 1 where the database can also store the claims of the corresponding U.S. patents and the claims of the corresponding European patents.

8. A method of creating a database for a collection of scientific or technical documents, such as patents and/or technical or scientific publications and/or abstracts of these patents or publications, by:

(a) creating a hierarchical model of subjects of potential interest (b) creating an expert technical search (ETS) for each subject-category), within the hierarchical model (c) automatically applying the set of ETS's against a set of electronically stored patents, patent abstracts, patent identifiers, technical index tenths, technical documents, and/or abstracts of these documents (d) using the results of the search strategies to electronically assign each patent or technical document to one or more subject-categories within the hierarchical model (e) Storing the set of subject-categories and unique patent identifiers or unique document identifiers in an electronic database table.

9. The method of claim 8 further comprising the step of electronically manipulating the stored subject-categories, the stored unique identifiers and the stored technical index tenths to display tabular summaries an graphical summaries of the stored data.

10. The method of claim 8 further comprising the step of using the tabular summaries and the graphical summaries to identify trends and discontinuities.

11. A method as of claim 7 where multiple-entity fields are parsed to create normalized, single-entity fields in a separate table including a unique identifier for each patent or technical document.

12. A method as of claim 7 where the expert technical search strategies are stored in a database and are applied against technical index terms, text, and/or abstract stored in the same database or against technical index terms, text and/or abstracts stored in a different database.

13. A method as of claim 8 where the relational database used to store, categorize, and manipulate patent abstracts can also store electronic objects such as graphic images, spreadsheets, video images and chemical structures linked to specific patent or document records.

14. A method as of claim 8 where the relational database used to store the patent abstracts and the subject-categories can display the patent abstracts, the U.S. claims, the European claims and the subject-categories on a single computer display screen by use of scrollable windows.

15. A method as of claim 8 where the database can also contain subject-specific tables of technical details such as catalyst precursors, cocatalysts, reaction conditions, reactor types, which are captured in a discrete form by scientists evaluating the underlying patents.

16. A method as of claims 8 where the database can also contain links to full-text sources of patents either in a local CD-ROM, a local LAN, a Wide-Area-LAN or on the Internet.

17. A method as of claim 8 wherein the set of technical searches are created, stored and executed on a commercial database system to identify the technology represented by each technical document or patent.

18. A method as of claim 8 wherein the set of technical searches are created and stored and executed on a local database system using documents captured from a commercial database system to identify the technology represented by each technical document or patent.

19. A method as of claim 8 wherein each technical search can automatically assign a set of technical documents or patents to one or more technical categories within a multi-dimensional hierarchy.

20. The method as in claim 8 further comprising the step of deriving each higher level of the multidimensional subject hierarchy from the sum of an aggregate count of unique items in each category multiplied by a weighting factors for each category in the next higher level, producing a higher (more abstract) level within the hierarchy:

$$f(x1)=sum((attribute\text{-}1*weighting\text{-}factor\text{-}1)+(attribute\text{-}2*weighting\text{-}factor\text{-}1)+\ldots)$$

$$f(x2)=sum((attribute\text{-}1*weighting\text{-}factor\text{-}2)+(attribute\text{-}2*weighting\text{-}factor\text{-}2)+\ldots)$$

$$f(x3)=sum((attribute\text{-}1*weighting\text{-}factor\text{-}3)+(attribute\text{-}2*weighting\text{-}factor\text{-}3)+\ldots).$$

21. A method as in claim 8 wherein the aggregate count of unique items is determined by modeling a scientific or business discipline based on the technical content of patents or technical documents in that scientific or business discipline.

22. A method as in claim 8 wherein the weighting factors are derived by the cumulative knowledge of experts in that scientific or business discipline to reflect the impact of each technical category on the next higher level of the hierarchy.

* * * * *